Sept. 18, 1962     D. P. ROESLER     3,054,247
LAWN MOWER
Filed Dec. 1, 1958     4 Sheets-Sheet 2
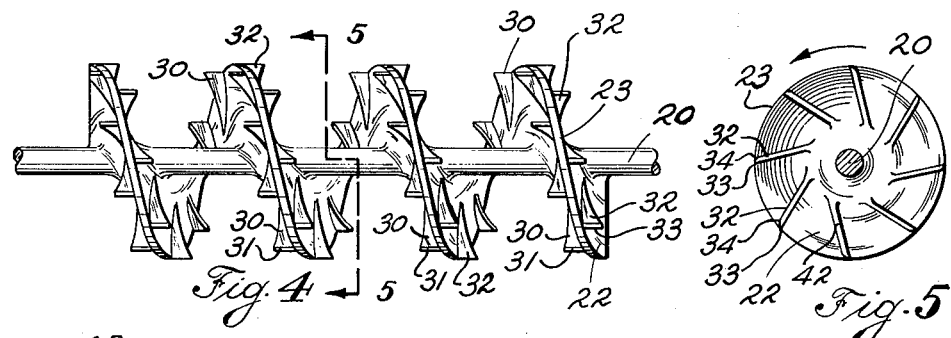
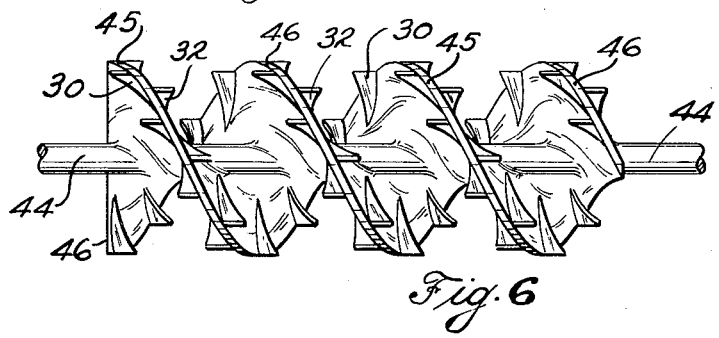
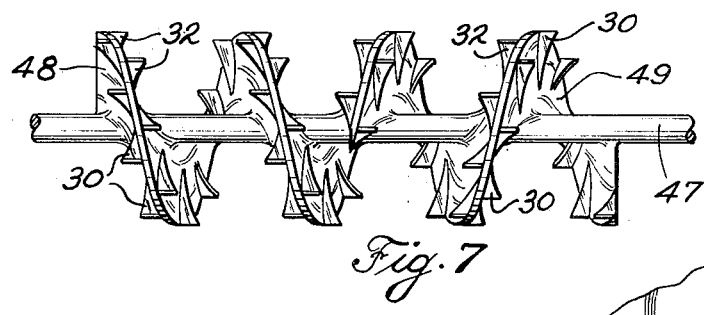
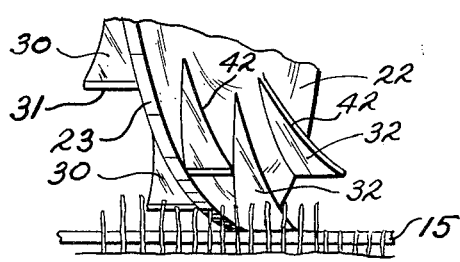
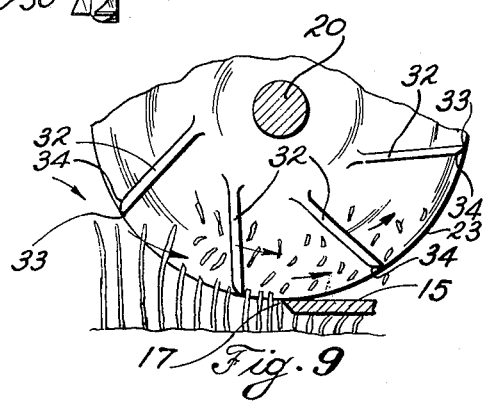
INVENTOR.
DANIEL P. ROESLER
BY
RICHEY, McNENNY & FARRINGTON
ATTORNEYS

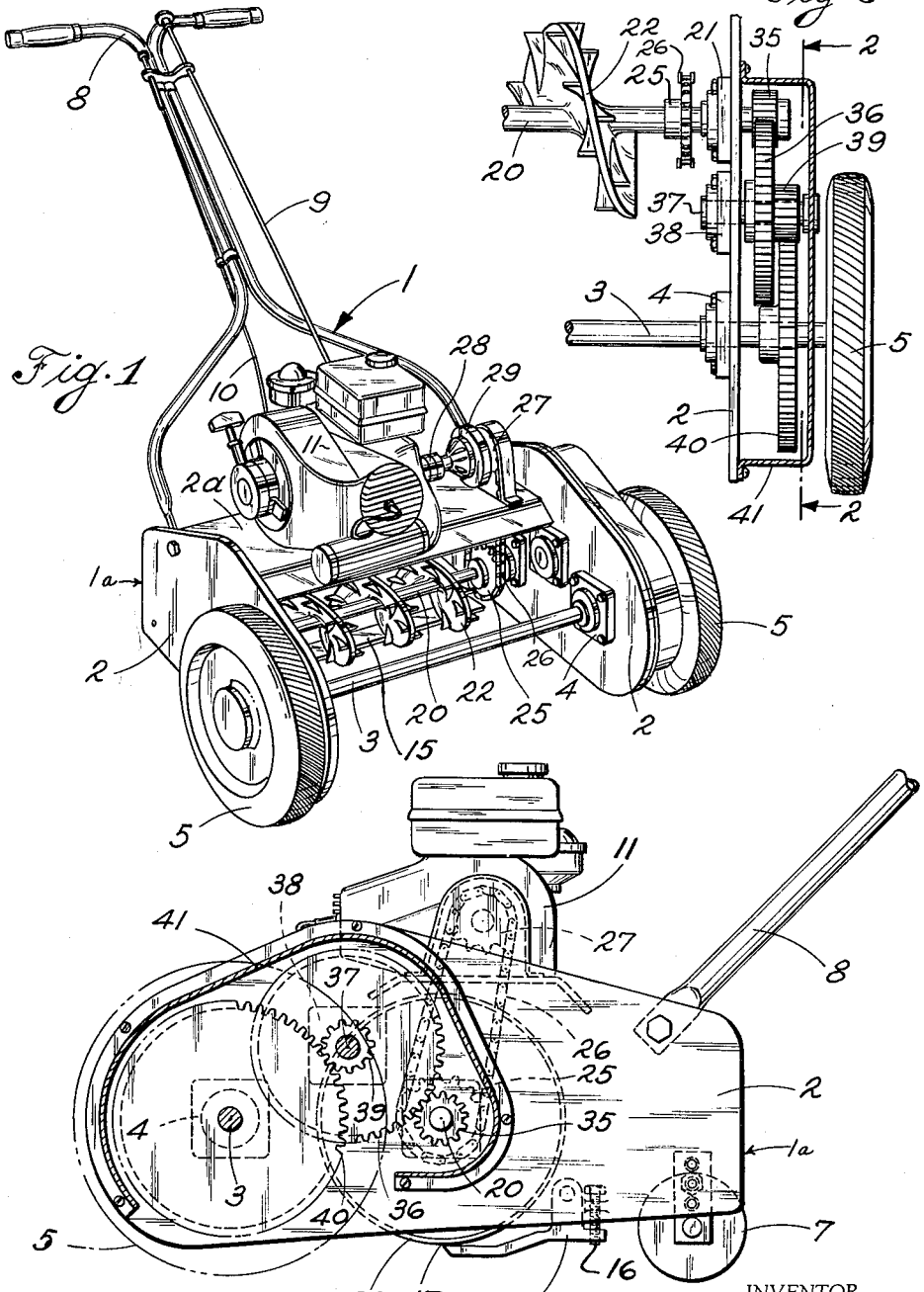

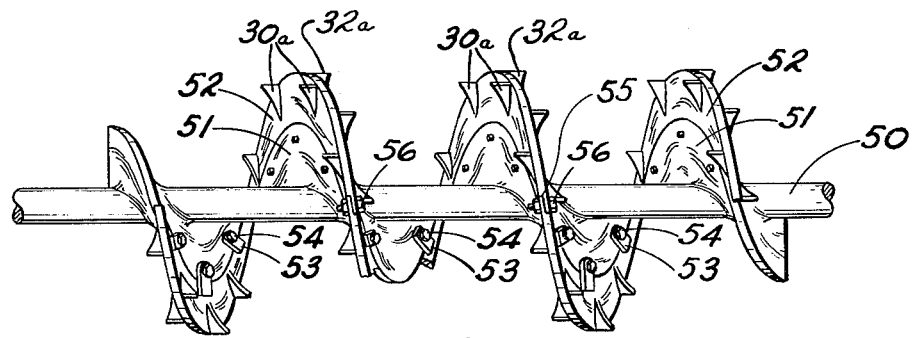
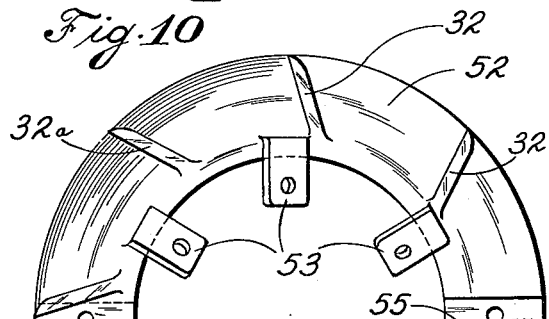
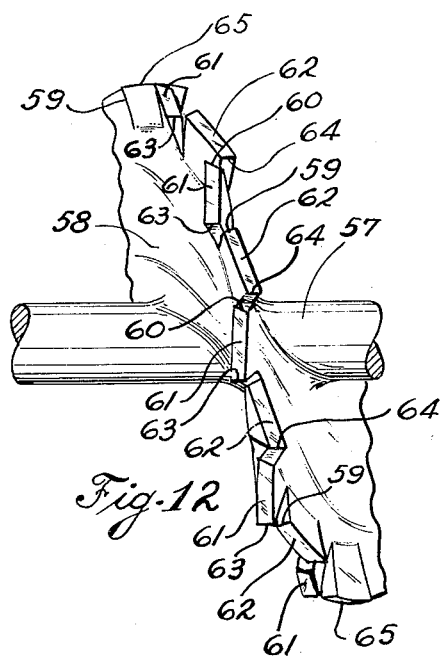
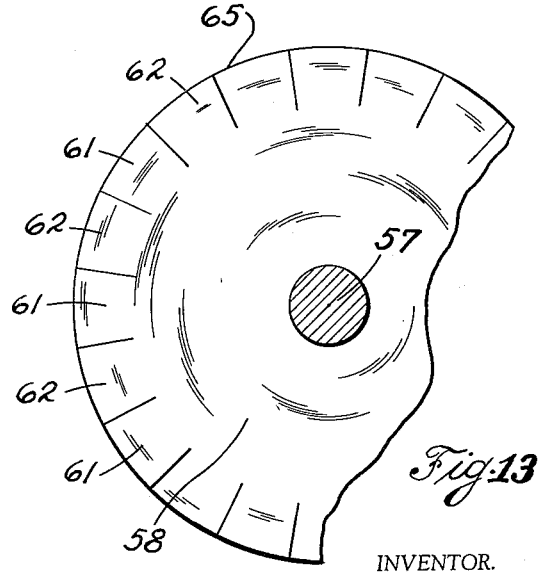

Sept. 18, 1962      D. P. ROESLER      3,054,247
LAWN MOWER
Filed Dec. 1, 1958      4 Sheets–Sheet 4
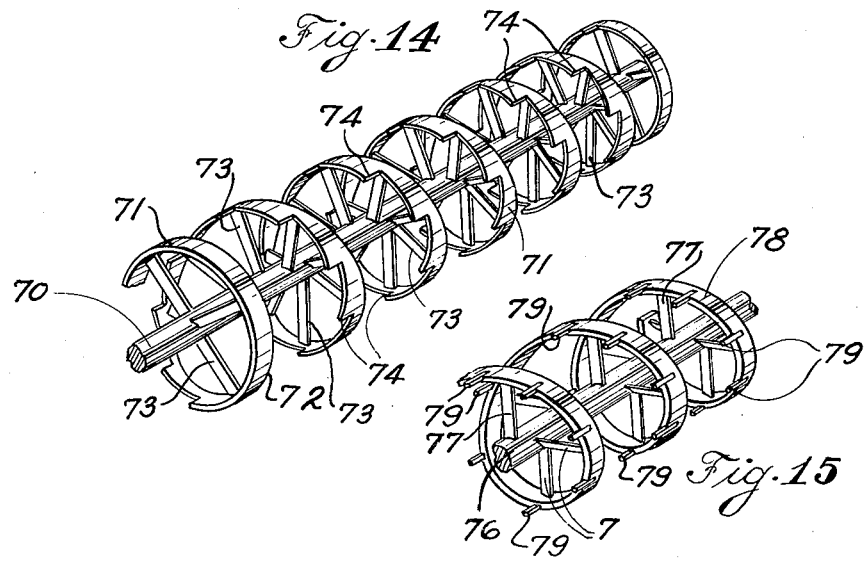
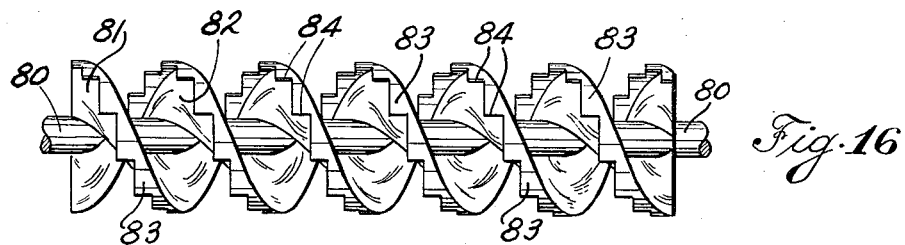
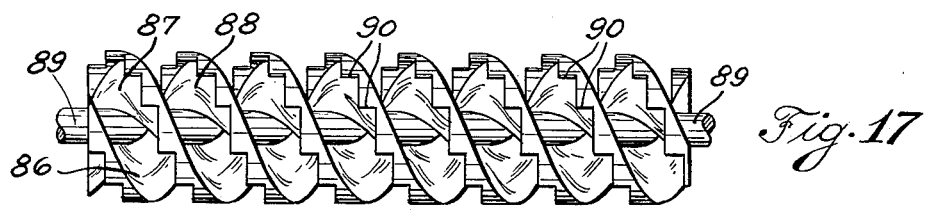
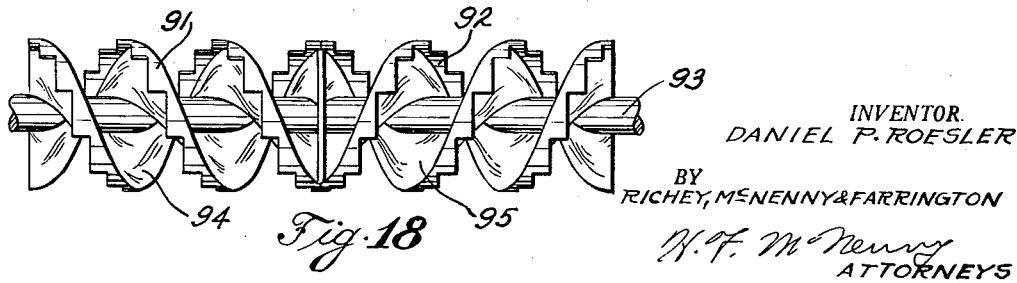
INVENTOR.
DANIEL P. ROESLER
BY
RICHEY, McNENNY & FARRINGTON
ATTORNEYS 3,054,247
LAWN MOWER
Daniel P. Roesler, P.O. Box 46, Deadwood, S. Dak.
Filed Dec. 1, 1958, Ser. No. 777,400
8 Claims. (Cl. 56—26)

This invention relates to a mower and more particularly to a new cutting mechanism for cutting grass and other vegetation.

In the mowing of lawns it is desirable to cut off all of the grass and other vegetation with smooth, clean cuts at a uniform level to provide the most attractive appearance. Heretofore, the closest approach to this goal has been attained by the so-called reel-type mowers embodying a number of longitudinally extending blades rotated against a bed-knife, the blades being spiraled so that at least one blade is always in contact with the bed-knife. Thus the shearing action of each progresses axially along the bed-knife, producing lateral components of force on the grass, tending to bend and shred some of it. In addition, such mowers are ineffective in tall grass or on tall weeds or stems scattered through shorter grass and also, even under the best conditions, produce a wavy surface because not all of the grass is cut off at the same level.

Various types of rotary mowers embodying blades driven through the standing grass designed to chop off the grass against its own inertia have been used with greater effect for cutting tall and rough grass, but such mowers do not produce a smooth, attractive surface because many of the stalks or leaves are merely bent over or are partially cut and shredded.

According to the present invention, cantilever blades are supported at one end for rotation about an axis, the blades comprising cutting edges projecting laterally parallel to the axis and positioned to sweep over a bed-knife parallel to the axis, the blades being rotated downwardly and rearwardly toward the bed-knife as the latter moves forwardly over the ground, so as to chop off some of the tall grass in advance of the bed-knife and trap and shear off substantially all grass that has escaped the chopping action.

This cutting operation produces a smoother and more uniform cut than can be achieved with either the reel type or the rotary type mowers heretofore used and is equally effective on carefully tended lawns requiring only a short amount of grass to be cut off and on long or irregular grass or vegetation.

According to another feature of this invention, the cutting blades are formed as teeth projecting laterally from one or more helical supporting strips mounted for rotation in engagement with the bed-knife, the cutting edges of the teeth being parallel to the knife with an unobstructed open space radially inward from each cutting edge through at least half the radius of the helix so that no forces are applied to the grass tending to force or bend it sideways either during the chopping action of the blade in advance of the bed-knife or the shearing action as it passes over the bed-knife.

It is a further feature of this invention to minimize or eliminate the radially outward air currents characteristic of reel type cutters, in which the blades act like a centrifugal blower and blow grass forwardly away from the bed-knife, by forming the cutting edges on the sides of helical strips presenting a minimum of radially extending surface to act as a centrifugal fan. Such air currents are further minimized or even reversed by forming the cutting edges with a positive rake to improve both the chopping and the shearing action and to apply a radially inward component of force to the air encountered by the cutting edges.

Optionally, another feature of the invention is to create air currents moving radially inwardly between the cutter blades in the cutting area by constructing the spokes or other supports for the blades to create air currents within the cutter.

Another feature of the present invention resides in forming the rotating cutter blades on one or more helical strips arranged to engage and rotate against the cutting edge of a bed-knife so that the rotating blades may contact the bed-knife without interference and without nicking the cutting edge of either, because the blades are flush with the continuous helical strip. This arrangement makes both the rotating blades and the bed-knife self-sharpening merely by keeping the parts adjusted into substantial contact with each other.

Other features and advantages of the present invention will become apparent from the following detailed description of the embodiments thereof.

In the accompanying drawings:

FIG. 1 is a perspective view of a lawn mower embodying the present invention;

FIG. 2 is a vertical sectional view taken on line 2—2 of FIG. 3;

FIG. 3 is a fragmentary top plan view, partly in section of the gear train of the mower of FIG. 1;

FIG. 4 is a fragmentary side elevational view of the preferred form of cutter reel as shown in FIGS. 1, 2 and 3;

FIG. 5 is a cross-sectional view taken on line 5—5 of FIG. 4;

FIG. 6 is a fragmentary side elevational view of a modified form of cutter reel similar to that of FIG. 4 but with a double helix;

FIG. 7 is a fragmentary side elevational view of a modified form of the cutter reel similar to that of FIG. 4 but with two helical flights of opposite sense with their adjacent ends spaced apart circumferentially of the reel;

FIG. 8 is an enlarged fragmentary front elevation looking toward the cutting edge of the bed-knife and showing a cutting blade is grass cutting position relative to the bed-knife;

FIG. 9 is an enlarged fragmentary end elevational view showing the relative position of cutting edges, grass blades and bed-knife during the cutting operation;

FIG. 10 is a fragmentary side elevational view of a modified form of the single helical section consisting of separable parts;

FIG. 11 is an end elevational view of one of the cutter blades carrying detachable parts shown in FIG. 10;

FIG. 12 is a fragmentary side elevational view of a modified form of the cutter reel having an integral helix with edges deformed to provide cutting blades;

FIG. 13 is an end elevational view of the reel of FIG. 12;

FIG. 14 is a perspective view of another modified form of cutter reel embodying elements of the present invention;

FIG. 15 is a fragmentary perspective view of another modified form of cutter reel;

FIG. 16 is a side elevational view of another modified form of the cutter reel embodying elements of the present invention and incorporating a pair of equally spaced helical flights;

FIG. 17 is a side elevational view of still another modified form of cutter reel showing three evenly spaced helical flights; and FIG. 18 is a side elevational view of another modified form of cutter reel in which the cutting edges are disposed along helical surfaces of opposite senses.

In general, the present invention comprises a reel having helical portions or flights the circumferential edges of which bear against a bed-knife supported substantially parallel to the axis of rotation of the reel, the helical flights carrying cantilever blades projecting laterally from one or both sides with cutting edges extending parallel to and bearing against the bed-knife, the cutting edges being arranged to sweep successively over the entire length of the bed-knife as the reel rotates so that all grass into which the bed-knife moves is sheared by the direct approach of two parallel edges and no lateral or spiral components are applied to the grass. The reel and bed-knife are supported on a frame having supporting wheels and preferably power means are provided to drive both the reel and the ground wheels at a pre-determined speed relation.

Referring now more particularly to FIGS. 1 to 3 of the drawings, 1 indicates generally a lawn mower having a frame 1a including side plates 2 and a top plate 2a. A shaft 3 is rotatably supported in bearings 4 carried by the side plates and has ground-engaging wheels 5 at its ends outside of plates 2. A vertically adjustable roller 7 is carried by plates 2 near their rear ends. Suitable guiding handles 8 are attached to plates 2 and carry a clutch control rod 9 and a throttle control rod 10 for motor 11 which is mounted on top plate 2a between plates 2. A bed-knife 15 extends between and is supported by plates 2 and screws 16 carried by plates 2 are provided for adjusting the vertical position of the cutting edge 17 of knife 15. The knife is preferably so positioned that its edge 17 is in the vertical plane passing through the axis of shaft 20 but, if desired, edge 17 may be a short distance to the rear of that plane since it appears that in cutting certain kinds of grass there is less tendency for the grass blades to be bent over and thereby cut to uneven lengths when the edge 17 is close to but to the rear of that plane.

A cutter reel is rotatably carried by plates 2. This reel comprises a shaft 20 which is rotatably mounted in bearings 21 carried by plates 2 and which has a helix 22 attached thereto. Shaft 20 is provided with a sprocket 25 and is rotated by a drive chain 26 which engages sprocket 25 and a corresponding sprocket 27 which is mounted on top plate 2a at one side of motor 11. The rotatable shaft 28 of motor 11 is provided with a clutch 29 or other suitable means by which it may be operatively connected with sprocket 27. It will be understood that when the clutch is engaged, the motor rotates cutter reel shaft 20.

Means for driving shaft 3 and wheels 5 is mounted on the outside of plate 2 which is adjacent to sprocket 25. Cutter reel shaft 20 extends through that plate 2 and carries a gear 35 keyed on its end outside of the plate. This gear meshes with gear 36 which is keyed to a shaft 37. This shaft is rotatably supported in a bearing 38 on plate 2 and also is keyed to gear 39 which meshes with gear 40 which is keyed to shaft 3. A housing 41 covers gears 35, 36, 39 and 40 to prevent injury to an operator and is open at the bottom for purposes of cleaning and oiling.

The reel comprising the shaft 20 and the helical flight 22 is shown in more detail in FIGS. 4 and 5. The reel has a single helical flight 22 which may be forged or cast integral with, or welded to, the shaft 20. The peripheral edge 23 of the flight 22 lies in a cylinder concentric with the axis of shaft 20 and is arranged to rotate in sliding engagement with the cutting edge 17 of the bed-knife 15.

Preferably, the ratio of the helical pitch of the flight 22 to the diameter of the cylinder defined by the peripheral edge 23 is about 3 to 4; so that if the reel should be, for example, eight inches in diameter, the spacing between successive portions of the peripheral edge 23 in engagement with the bed-knife 15 would be about six inches.

Projecting from one side of the helical flight 22 is a series of blades 30 each of which has a cutting edge 31 lying in the cylinder defined by the peripheral edge 23 and extending parallel to the axis of the shaft 20. Projecting from the opposite side of the helical flight 22 is a similar series of blades 32 each of which has a cutting edge 33 lying in the cylinder defined by the peripheral edge 23. The blades 30 and 32 are welded to, or cast or forged integral with, the flight 22 and are supported as cantilevers, the outer ends being free. The blades 30 and 32 are similar except that the cutting edges 31 meet the flight 22 in an obtuse angle and the cutting edges 33 meet the flight 22 in an acute angle. The radial outer end surfaces of the blades 30 and 32 are preferably cut away or relieved slightly behind the cutting edges 31 and 33, respectively, as indicated at 34 so that the cutting edges 31 and 33 may contact or pass close to the cutting edge 17 of the bed-knife 15 without interference between the bed-knife and the remainder of the outer edges of the blades.

In the illustrated embodiment, each of the blades 30 and 32 is generally triangular in shape with a free side edge 42 sloping inwardly from the free outer end of the cutting edges and merging into the helical flight 22. Preferably, each of the blades 30 and 32 is inclined with respect to radius lines from the axis of shaft 20 to the cutting edges 31 and 33, so that the blades are disposed substantially tangent to the shaft 20, the radially outer ends of the blades being advanced in the direction of rotation with respect to the inner ends of the blades as illustrated in FIGS. 5 and 9. With this arrangement the blades 30 and 32 tend to sweep air radially inwardly adjacent the opposite sides of the flight 22, counteracting or reversing the flow of air which would otherwise be produced by the centrifugal fan effect of the blades, thereby avoiding radial air currents tending to blow grass downwardly in front of the bed-knife 15.

The axial length of the cutting edges 31 and 33 is preferably small relative to the helical pitch of the flight 22; thus, with a pitch of about six inches an axial length of the cutting edges 31 and 33 of about one-quarter inch has been found to be satisfactory. Radially inward from each of the cutting edges 31 and 33 the reel defines an open, unobstructed space extending substantially to the outer surface of the shaft 20 in the illustrated embodiment but which is preferably at least as long as about one-half the radius of the cylinder defined by the peripheral surface of the reel. The circumferential spacing of the blades 30 is determined by the relation between the axial length of the cutting edges 31 and the pitch of the helical flight 22 which are so related that all portions of the length of the cutting edge 17 on the bed-knife 15 are swept by at least one cutting edge during each revolution of the shaft 20. In the illustrated embodiment the blades 30 are so spaced that a plane perpendicular to the shaft 20 passing through the junction of one cutting edge 31 with the flight 22 also passes through the cutting edge 31 of the next preceding blade 30 but does not intersect the second preceding blade.

The blades 32 are similarly spaced circumferentially but are staggered with respect to the blades 30 as illustrated in FIGS. 4 and 8. The relative spacing of each blade 30 from the next following blade 32 is correlated with the thickness of the flight 22 so that the increment of length of the cutting edge 17 of the bed-knife which is in engagement with the peripheral edge 23 of the helical flight 22 when the blade 30 passes the edge 17 is swept by the next following blade 32 so that any grass which is pushed down by the peripheral edge 23 when each blade 30 passes the edge 17 is trapped and sheared off by the next following blade 32.

In the embodiment of FIGS. 1 to 5 both the reel and the ground wheels of the mower are driven by the motor 11. The speed ratio between the rotation of the reel and the forward travel of the mower determines the frequency of cutting and, therefore, the smoothness of the resulting cut surface. For producing an extremely smooth surface of the cut grass, it is preferred to use a speed ratio such that each increment of length of the bed-knife cutting edge 17 is swept by at least one blade 30 or 32 once during each inch of forward travel of the bed-knife 15. It is found that this produces as smooth a cut surface as a conventional reel-type mower with helical cutting edges arranged to cut at three-eighths inch intervals. Such a conventional reel-type mower requires a very large number of helical blades carried by the reel and extremely slow operating speed to avoid blowing the grass to be cut down away from the bed-knife by the air thrown out centrifugally by the reel. The mower according to the present invention produces an equally good surface with a cutting frequency of one inch because the cutting edges of the blades are parallel to the cutting edge of the bed-knife so that no lateral component is applied to any part of the grass.

The action of the blades in cutting grass is illustrated diagrammatically in FIGS. 8 and 9. Some of the taller grass is partially chopped off before it is reached by the forward progress of the bed-knife 15 by the cutting edges 31 and 33 sweeping downwardly and rearwardly toward the bed-knife. As each blade approaches the bed-knife the remaining standing grass, including any torn or rough upper ends that may have been produced by the chopping action of preceding blades, is trapped between the cutting edges 31 and 33 and the parallel cutting edge 17 of the bed-knife and sheared off cleanly. Any grass bent down by contact with the peripheral edge surface 23 is freed and caught by the next following cutting edge 33. Any tall grass which escapes the chopping action as the reel approaches it is free to stand in the space between the convolutions of the helix 22 and the open space between successive blades 30 until the bed-knife cutting edge 17 approaches so that it is trapped and sheared by one of the edges. Wet or heavy grass that may tend to stick to the leading sides of the blades 30 or 32 is pushed radially inwardly by successive cuts until it is forced to drop off by reason of the inward sloping and disappearance of the free side edge 42 of the blade. The reel may be rotated at relatively high speed with consequent high forward speed of the mower over the ground since the radial air currents characteristic of conventional reel mowers which prevent such high speed operation are minimized or eliminated.

A slightly modified form of reel is illustrated in FIG. 6. In this embodiment a central shaft 44 carries two diametrically opposed helical flights 45 and 46 each of which is provided with cantilever blades 30 and 32 projecting from opposite sides thereof arranged in the same way and operating the same as the blades 30 and 32 carried by the single helix 22 illustrated in FIGS. 1 and 4. As shown in FIG. 6, the pitch of each of the helices 45 and 46 is substantially twice the pitch of the helix 22 of FIG. 4 so that the spacing between peripheral portions of the reel engaging the bed-knife is substantially the same as in FIG. 4. However, the multiple lead helix of FIG. 6 may be used with a lesser pitch so as to increase the frequency of cut for a given speed of rotation of the reel.

In the forms of reel illustrated in FIGS. 4 and 6 the helical flights progress in one direction along the length of the shaft so that air and loose grass cuttings are also progressed or blown in the same direction with respect to the shaft. While this axial air flow is desirable in reducing radial air currents from the bed-knife, it is sometimes desired to distribute the grass cuttings equally in both directions. This is accomplished by the embodiment illustrated in FIG. 7 in which a shaft 47 is provided with two helices 48 and 49 of opposite senses. The helix 48 is substantially identical to the helix 22 of FIG. 4 and is equipped with identical blades 30 and 32. The helix 48 starts at the mid-point of the shaft and progresses to the left-hand end as seen in FIG. 7. The helix 49 starts at the mid-point of the shaft diametrically opposite the starting end of the helix 48 and progresses to the right-hand end of the shaft 47. The helix 49 is also equipped with the identical blades 30 but, as will be evident, these blades are disposed on opposite sides with respect to their position on the helix 48. Thus, as seen in FIG. 4, the blades 30 are on the left-hand side of the helical flight 22 and the blades 32 are on the right-hand side. The blades 30 and 32 have the same arrangement on the helix 48 as seen in FIG. 7. On the helix 49, however, the blades 30 are on the right-hand side and the blades 32 are on the left-hand side.

The reel illustrated in FIGS. 10 and 11 is the same as that illustrated in FIG. 4 except that the blades are carried by a removable rim which may be made in one piece or from a plurality of substantially semi-circular pieces 52, one of which is illustrated in FIG. 11. Each of the segments 52 carries cantilever blades 30a and 32a identical in every respect to the blades 30 and 32 illustrated in FIG. 4. The segments 52 are secured to the peripheral surface of the helical flight 51 in any suitable manner as by lugs 53 integral with the segments 52 and fastened by bolts 54 threaded into the helical flight 51. The ends of each segment 52 are rabbeted as illustrated at 55 and adjacent ends of successive segments are fastened together by bolts 56. This arrangement permits ready removal and replacement of any part of the reel structure which may be damaged. At the same time it facilitates manufacture of the reel since the segments 52 are identical and may be forged or cast with the blades 30a and 32a and the attaching lugs 53.

FIGS. 12 and 13 illustrate another form of cutting reel embodying the present invention. In this form the shaft 57 has formed integral therewith or secured thereto a helical flight 58 having an axial thickness sufficient to provide the desired axial length of cutting blades. Alternately arranged radial slits 59 and 60 are cut through the helix 58 and extend inwardly from the periphery thereof. The slits 59 and 60 form fingers 61 and 62 which are twisted in opposite directions to form cantilever blades projecting from opposite sides of the helix 58.

The slits 59 are cut through the helix 58 on planes substantially perpendicular to the sides of the helix 58. The fingers 61 are twisted so as to move their leading edges 63, formed by the slits 59, out of the plane of the helix and into position substantially parallel with the axis of the shaft 57. As seen in FIG. 12, the leading edges 63 of the fingers 61 have been twisted to the left. The slits 60, on the other hand, are cut at a helical angle equal to the complement of the helical angle of helical flight 58 and in the same rotational direction, so that when the fingers 62 are twisted in the opposite direction to the fingers 61, the leading edges 64 of the fingers 62 are also substantially parallel with the axis of the shaft 57.

After the fingers 61 and 62 have been twisted, the peripheral surfaces 65 of the fingers 61 and 62 are turned or ground to define a cylinder concentric with the axis of the shaft 57, as illustrated in FIG. 13. The reel may then be mounted to rotate in cutting engagement with the bed-knife and the sharp leading edges 63 and 64 are parallel to the bed-knife and operate like the cutting edges 31 and 33 of the reel shown in FIGS. 4 and 5.

The cutter reel of FIG. 14 comprises the shaft 70, a helix 71 consisting of a strip of metal 72 wound about shaft 70 with the outer surface of each turn lying on the surface of a cylinder, and spokes 73 extending more or less radially between and attached to the shaft and the inner surface of each turn of the helix. The metal strip 72 is provided along one edge thereof with a plurality of circumferentially spaced, integral, axially extending cutting edges 74 formed adjacent notches cut in the strip 72. The cutting edges 74 are formed parallel to the axis of the shaft 70 and the circumferential edges of the notches are perpendicular to the cutting edges 74. Thus, the circumferential spacing between the cutting edges 74 is determined by the pitch of the helical strip 72 and the axial length of the cutting edges 74. The outer surface of the strip 72 is arranged to bear on the cutting edge 17 of the bed-knife 15 so that the cutting edges 74 also bear against the parallel cutting edge 17 without striking or nicking either the cutting edges 74 or the bed-knife edge 17. The notches cut in the strip 72 thus form cantilever blades having axially extending edges 74 projecting from one side only of the helix instead of from both sides as in the embodiments previously described. It will be understood that blades may be arranged on only one side or on both sides of each of the forms disclosed.

Spokes 73 are shown as being made of flat pieces of metal and some of these spokes are positioned with their flat surfaces at an angle to the axis of shaft 70. An advantage of this arrangement of the flat spokes is that when the reel is rotated these inclined spokes impart an axial component of force to the air and cause air to flow axially within the cutter reel and out at one end thereof. Such axial flow of air causes air to flow radially into the cutter reel between the turns of the helix and such radial flow of air tends to draw the blades of grass upwardly just before they encounter the cutting edge 17 of bed-knife 15. While the inclined blades tend to draw air more or less radially into the helix from all sides, it is possible by suitably shielding the cutter reel to cause a maximum flow of air into the helix from just in front of cutting edge 17 and thus to exert the maximum influence on entraining blades of uncut grass ahead of the reel and thereby offsetting the tendency of the blades to bend over due to radially outward air currents such as are created by the axially elongated, slightly twisted cutter blades of conventional mowers.

In FIG. 15 the cutter reel comprises a shaft 76 and spokes 77 which are quite like shaft 70 and spokes 73 of FIG. 14. The helix of FIG. 15 differs from that of FIG. 14 in that the helical strip of metal 78 is provided with spaced, narrow, axially extending blades 79 embedded in or otherwise securely attached thereto and projecting therefrom parallel to the axis of the shaft 76. The leading edges of these blades 79 are sharpened as by being beveled and are disposed to move in close proximity to cutting edge 17 of bed-knife 15. An advantage of the reel construction of FIG. 15 is that if any blade 79 is damaged, it may be replaced or repaired without necessitating replacement of the entire reel.

The cutter reel of FIG. 16 includes a shaft 80 and a double helix consisting of two flat strips of metal 81 and 82, each of which has a flange 83 projecting at right angles therefrom along its outer edge. The flanges 83 describe helical courses around shaft 80 with the outer surface of the flanges lying throughout substantially their full length on the surface of a cylinder co-axial with the shaft 80. Strips 81 and 82 may be attached to shaft 80 in any suitable manner, for example, by welding. The edges of flanges 83 are provided with a plurality of notches, an edge of which forms a cantilever blade having a cutting edge 84 which is positioned substantially parallel to the axis of the shaft 80 in the same manner as the edges 74 of FIG. 14. Since the strips 81 and 82 form double lead helices, each point on the length of the bed-knife edge 17 is swept by a cutting edge 84 twice for each revolution of the shaft 80.

The cutter reel shown in FIG. 17 resembles that shown in FIG. 16 but in this case three helical metal strips 86, 87 and 88 are secured to the shaft 89, so that each point on the bed-knife is swept by a parallel cutting edge 90 three times for each revolution of the reel.

In FIG. 18 the cutter reel is quite similar to that shown in FIGS. 14 to 17, but in this case two helical strips 91 and 94 extend from the center of the shaft 93 toward one end, and helices 92 and 95 of opposite sense extend from the center toward the other end. This arrangement provides a better distribution of the cuttings and of the air currents drawn in to the reel and discharged axially at both ends, as described in connection with the form shown in FIG. 7.

The mower of this invention is effective in cutting blades of grass neatly, evenly and without shredding the stalks. It is noted that mowers incorporating this invention are versatile in that they may be utilized with efficacy in a variety of conditions including general lawn care, in the cutting of fine grass such as may be found, for example, on golf greens, and also in cutting weeds, grass or other vegetation ranging to a foot or more in height.

Accordingly, the mowers of this invention are economical through being universal and obviate the purchase, care and maintenance of various machines each adapted only to use under certain conditions of grassy areas to be cut.

While this invention has been described with reference to certain specific embodiments thereof, it is to be understood that numerous variations and alterations may be made without deviating or departing from the spirit or scope of the invention as defined in the following claims.

I claim:

1. A lawn mower comprising a supporting frame, a reel supported in said frame for rotation about an axis, said reel including a helix of relatively narrow, axially spaced portions extending completely around and progressing aixally along said axis and having outer surfaces lying in a cylinder concentric with said axis, said reel having cantilever blades projecting laterally from said portions at circumferentially spaced points, each of said blades having a cutting edge lying in said cylinder and extending parallel to said axis, said reel defining an open space radially within the entire length of each of said cutting edges and extending radially inwardly therefrom through at least substantially one-half of the radius of said cylinder, and a bed-knife supported by said frame adjacent to the bottom of said reel and having a cutting edge positioned parallel to said axis and in close cutting relation to the cutting edges of said reel.

2. A lawn mower comprising a supporting frame, a reel supported in said frame for rotation about an axis, said reel including a helix of relatively narrow, axially spaced portions extending completely around and progressing axially along said axis and having outer surfaces lying in a cylinder concentric with said axis, said reel having cantlever blades projecting laterally from said portions at helically spaced points, each of said blades having a cutting edge lying in said cylinder and extending parallel to said axis and having an axial length at least as great as the helical pitch between adjacent blades, said reel defining an open space radially within the entire length of each of said cutting edges and extending radially inwardly therefrom through at least substantially one-half of the radius of said cylinder, and a bed-knife supported by said frame adjacent to the bottom of said reel and having a cutting edge positioned parallel to said axis and in close cutting relation to the cutting edges of said reel.

3. A lawn mower comprising a supporting frame, a reel supported in said frame for rotation about an axis, said reel including a relatively narrow open helix extending completely around and progressing axially along said axis and having an outer surface lying in a cylinder concentric with said axis, said helix having cantilever blades projecting laterally therefrom at helically spaced points, each of said blades having a cutting edge lying in said cylinder and extending parallel to said axis and having an axial length at least as great as the helical pitch between adjacent blades, said reel defining an open space radially within the entire length of each of said cutting edges and extending radially inwardly therefrom through at least substantially one half of the radius of said cylinder, and a bed-knife supported by said frame adjacent to the bottom of said reel and having a cutting edge positioned parallel to said axis and in close cutting relation to the cutting edges of said reel.

4. A lawn mower comprising a frame supported for movement over the ground, a shaft rotatably supported in said frame, a reel carried by said shaft including axially spaced portions extending around and progressing axially along said shaft and having outer surfaces lying in a cylinder concentric with said shaft, said reel having cantilever blades projecting laterally from said portions at circumferentially spaced points, each of said blades having a cutting edge lying in said cylinder and extending parallel to said axis, said reel defining an open space radially within said cutting edges and around the free ends of said blades and extending radially inward to said shaft through at least substantially one-half the radius of said cylinder, and supporting means for said reel connected to said reel and to said shaft and having helically arranged portions acting to create axial air currents within said reel and through said open space when said shaft is rotated.

5. A reel for use on a lawn mower having a laterally and axially extending cutting bar adjacent the bottom thereof comprising a shaft adapted to be rotatably mounted in a mower, an open helix extending around said shaft and having an outer surface lying in a cylinder spaced outwardly from and concentric with said shaft, said helix having cantilever blades projecting laterally therefrom at circumferentially spaced points, each of said blades having a cutting edge lying in said cylinder and extending parallel to said axis, said reel defining an open space radially within each of said cutting edges and around the free end of each of said blades, said spaces extending radially inwardly from said edges through at least substantially one-half of the radius of said cylinder.

6. A lawn mower comprising a frame supported for movement over the ground, a reel supported in said frame for rotation about an axis, said reel including a metallic portion having an outer surface extending around said axis in the form of an open helix, a first series of helically spaced cantilever blades having cutting edges facing in one circumferential direction and projecting from one side of said metallic portion, a second series of helically spaced cantilever blades having cutting edges facing in the same circumferential direction and projecting from the opposite side of said metallic portion, said reel defining an open space radially within the entire length of each of said cutting edges and extending radially inward therefrom through at least substantially one-half the radius of said cylinder, said second series of blades being staggered circumferentially with respect to said first series, each of the cutting edges of said first series of blades intersecting a plane normal to said axis which also intersects the next succeeding cutting edge of said second series, all of said cutting edges lying in a cylinder concentric with said axis, a bed-knife supported by said frame adjacent to the bottom of said reel and having a cutting edge extending parallel to said axis and in cutting relation with all of said blades, and means for rotating said reel in said one circumferential direction.

7. A lawn mower comprising a frame supported for movement over the ground, a reel supported in said frame for rotation about an axis, said reel including a metallic portion having an outer surface extending around said axis in the form of an open helix, a first series of helically spaced cantilever blades having cutting edges facing in one circumferential direction and projecting from one side of said metallic portion, a second series of spaced cantilever blades having cutting edges facing in the same circumferential direction and projecting from the opposite side of said metallic portion, all of said cutting edges lying in a cylinder concentric with said axis, each of said cutting edges of said first series of blades intersecting a plane normal to said axis which also intersects the cutting edges of the next preceding blade of said first series and the next succeeding blade of said second series, a bed-knife supported by said frame adjacent to the bottom of said reel and having a cutting edge extending parallel to said axis and in cutting relation with all of said blades, and means for rotating said reel in said one circuferential direction.

8. A reel for a lawn mower as defined in claim 5 characterized in that said open helix is mounted on said shaft by a plurality of flat spokes extending between said helix and said shaft, the opposed edges of said spoke being axially displaced to impart movement to air adjacent thereto whereby the rotation of said spoke is effective to draw air toward said shaft along the length of said reel.

References Cited in the file of this patent
UNITED STATES PATENTS

| | | |
|---|---|---|
| 23,552 | Colborn | Apr. 12, 1859 |
| 371,288 | Walker | Oct. 11, 1887 |
| 2,063,067 | Waller | Dec. 8, 1936 |
| 2,509,343 | Henderson | May 30, 1950 |
| 2,538,359 | Ferrell | Jan. 16, 1951 |
| 2,547,401 | Loewe et al. | Apr. 3, 1951 |
| 2,634,567 | Huitema | Apr. 14, 1953 |
| 2,644,501 | Perry | July 7, 1953 |
| 2,790,294 | Marich | Apr. 30, 1957 |
| 2,831,308 | Raba | Apr. 22, 1958 |
| 2,860,475 | Richard | Nov. 18, 1958 |
| 2,869,310 | Benson | Jan. 20, 1959 |